US007836378B2

(12) United States Patent  
Shaeffer et al.

(10) Patent No.: US 7,836,378 B2
(45) Date of Patent: Nov. 16, 2010

(54) SYSTEM TO DETECT AND IDENTIFY ERRORS IN CONTROL INFORMATION, READ DATA AND/OR WRITE DATA

(75) Inventors: Ian Shaeffer, Los Gatos, CA (US); Craig Hampel, Los Altos, CA (US); Yuanlong Wang, Sunnyvale, CA (US); Fred Ware, Los Altos Hills, CA (US)

(73) Assignee: Rambus Inc., Los Altos, CA (US)

( * ) Notice: Subject to any disclaimer, the term of this patent is extended or adjusted under 35 U.S.C. 154(b) by 51 days.

(21) Appl. No.: 12/035,022

(22) Filed: Feb. 21, 2008

(65) Prior Publication Data

US 2008/0163007 A1 Jul. 3, 2008

Related U.S. Application Data

(63) Continuation of application No. 11/436,284, filed on May 18, 2006.

(51) Int. Cl.
*G11C 29/00* (2006.01)

(52) U.S. Cl. .................. 714/763; 714/768; 714/758

(58) Field of Classification Search .................. 714/763, 714/758, 768

See application file for complete search history.

(56) References Cited

U.S. PATENT DOCUMENTS

| | | | |
|---|---|---|---|
| 3,893,072 A | | 7/1975 | D'Antonio et al. |
| 4,054,911 A | * | 10/1977 | Fletcher et al. ............ 348/463 |
| 4,363,125 A | | 12/1982 | Brewer et al. |
| 4,394,763 A | | 7/1983 | Nagano et al. |

(Continued)

OTHER PUBLICATIONS

Siewiorek, Dan., Lecture Handout "20 Fault Tolerance & Memory Hierarchy," Carnegie Mellon University, Nov. 23, 1998.

(Continued)

*Primary Examiner*—M. Mujtaba K Chaudry
(74) *Attorney, Agent, or Firm*—Vierra Magen Marcus & DeNiro LLP

(57) ABSTRACT

An integrated circuit, such as an integrated circuit memory or buffer device, method and system, among other embodiments, generate a plurality of error codes, such as CRC codes, corresponding to control information, write data and read data transactions, respectively. The plurality of separately generated CRC codes is logged or stored in respective storage circuits, such as circular buffers. The stored plurality of CRC codes corresponding to each transaction then may be used to determine whether an error occurred during a particular transaction and thus whether a retry of the particular transaction is issued. The integrated circuit includes a compare circuit to compare a CRC code generated by the integrated circuit with a CRC code provided by a controller device. A CRC code corresponding to read data is transferred to a controller device using a data mask signal line that is not being used during a read transaction. The CRC code generated by the integrated circuit then may be compared to a CRC code generated by the controller device to determine whether an error occurred. The controller device generates and stores a plurality of CRC codes, corresponding to control information, write data and read data. The controller device then compares the CRC codes generated by the controller device with CRC codes generated and stored in the integrated circuit to determine whether an error has occurred during a particular transaction.

41 Claims, 7 Drawing Sheets

U.S. PATENT DOCUMENTS

| | | | |
|---|---|---|---|
| 4,456,993 | A | 6/1984 | Taniguchi et al. |
| 4,527,237 | A | 7/1985 | Frieder et al. |
| 4,535,455 | A | 8/1985 | Peterson |
| 4,888,773 | A | 12/1989 | Arlington |
| 4,920,539 | A | 4/1990 | Albonesi |
| 4,970,714 | A | 11/1990 | Chen et al. |
| 5,341,251 | A * | 8/1994 | Fincher et al. ............. 360/49 |
| 5,347,643 | A * | 9/1994 | Kondo et al. ............. 711/211 |
| 5,404,361 | A | 4/1995 | Casorso et al. |
| 5,488,691 | A * | 1/1996 | Fuoco et al. ............. 714/52 |
| 5,490,153 | A | 2/1996 | Gregg et al. |
| 5,502,733 | A | 3/1996 | Kishi et al. |
| 5,553,231 | A | 9/1996 | Papenberg et al. |
| 5,588,112 | A | 12/1996 | Dearth et al. |
| 5,751,932 | A | 5/1998 | Horst et al. |
| 5,751,955 | A | 5/1998 | Sonnier et al. |
| 5,987,628 | A | 11/1999 | Von Bokern et al. |
| 6,003,151 | A | 12/1999 | Chuang |
| 6,189,123 | B1 | 2/2001 | Anders Nystrom et al. |
| 6,308,294 | B1 | 10/2001 | Ghosh et al. |
| 6,314,541 | B1 | 11/2001 | Seytter et al. |
| 6,393,504 | B1 | 5/2002 | Leung et al. |
| 6,397,365 | B1 | 5/2002 | Brewer et al. |
| 6,438,723 | B1 | 8/2002 | Kalliojarvi |
| 6,507,928 | B1 * | 1/2003 | Richardson ............. 714/800 |
| 6,606,589 | B1 * | 8/2003 | Tuma et al. ............. 703/24 |
| 6,625,749 | B1 | 9/2003 | Quach |
| 6,725,414 | B2 | 4/2004 | Seyyedy |
| 6,754,856 | B2 | 6/2004 | Cofler et al. |
| 6,779,148 | B2 | 8/2004 | Tanaka |
| 6,792,501 | B2 | 9/2004 | Chen et al. |
| 6,851,081 | B2 | 2/2005 | Yamamoto |
| 6,883,130 | B2 | 4/2005 | Wilhelmsson et al. |
| 6,912,682 | B1 | 6/2005 | Aoki |
| 6,941,493 | B2 | 9/2005 | Phelps |
| 6,990,604 | B2 | 1/2006 | Binger |
| 7,200,770 | B2 | 4/2007 | Hartwell et al. |
| 7,231,580 | B2 * | 6/2007 | Shiota et al. ............. 714/765 |
| 7,339,759 | B2 * | 3/2008 | Hashimoto ............. 360/31 |
| 7,340,641 | B1 | 3/2008 | Binger |
| 7,418,436 | B2 * | 8/2008 | Maeda et al. ............. 1/1 |
| 7,421,547 | B2 * | 9/2008 | Matsui et al. ............. 711/156 |
| 7,529,965 | B2 * | 5/2009 | Ikeuchi et al. ............. 714/5 |
| 2002/0053042 | A1 | 5/2002 | Brown |
| 2003/0115417 | A1 * | 6/2003 | Corrigan ............. 711/118 |
| 2004/0073649 | A1 * | 4/2004 | Inami et al. ............. 709/223 |
| 2004/0088497 | A1 * | 5/2004 | Deans et al. ............. 711/146 |
| 2004/0139310 | A1 * | 7/2004 | Maeda et al. ............. 713/2 |
| 2004/0205433 | A1 | 10/2004 | Gower et al. |
| 2004/0209420 | A1 | 10/2004 | Ljungcrantz et al. |
| 2004/0237001 | A1 * | 11/2004 | Schulz et al. ............. 714/42 |
| 2005/0055522 | A1 * | 3/2005 | Yagi ............. 711/163 |
| 2005/0073899 | A1 * | 4/2005 | Gallivan et al. ............. 365/232 |
| 2006/0077750 | A1 * | 4/2006 | Pescatore ............. 365/232 |
| 2006/0098320 | A1 * | 5/2006 | Koga et al. ............. 360/53 |
| 2006/0123483 | A1 * | 6/2006 | Cohen ............. 726/26 |
| 2007/0043917 | A1 * | 2/2007 | Matsui et al. ............. 711/156 |
| 2007/0150872 | A1 | 6/2007 | Vohra |
| 2007/0162825 | A1 * | 7/2007 | Wang et al. ............. 714/763 |
| 2009/0006863 | A1 * | 1/2009 | Mizuno ............. 713/190 |

OTHER PUBLICATIONS

May, Phil, et al., "HiPER: A Compact Narrow Channel Router with Hop-by-Hop Error Correction," IEEE Transactions on Parallel and Distributed Systems, vol. 13, No. 5, May 2002, pp. 485-498.

Haas, Jon, et al., "Advances in Server Memory Technology," presented at Spring 2005 Intel Developers Forum, San Francisco, CA, Mar. 1, 2005.

Digital Equipment Corp.,"Software Product Description, Product Name: HSC Software, Ver. 6.5," Jun. 1992.

Digital Equipment Corp., "Software Product Description, Product Name: HSC High Performance Software, Ver. 8.6," Jun. 1996.

"Forward error correction," Wikipedia, http://en.wikipedia.org/wiki/forward_error_correction.

International Search Report for International Application No. PCT/US2006/020698, mailed Mar. 6, 2007.

International Search Report & the Written Opinion of the International Searching Authority, Patent Cooperation Treaty, Application No. PCT/US2007/011733, Jan. 11, 2008.

International Preliminary Report on Patentability, Patent Cooperation Treaty, Application No. PCT/US2007/011733 filed on May 16, 2007, Aug. 12, 2008.

Restriction Requirement dated Jan. 8, 2010, United States Patent & Trademark Office, U.S. Appl. No. 11/436,284, filed May 18, 2006.

Response to Restriction Requirement dated Feb. 8, 2010, U.S. Appl. No. 11/436,284, filed May 18, 2006.

Kilbuck, Kevin, et al., "Fully Buffered DIMM - Unleashing Server Capacity," Micron Technology, Inc., Apr. 8, 2005.

Non-Final Office Action dated May 3, 2010, U.S. Patent & Trademark Office, U.S. Appl. No. 11/436,284 filed May 18, 2006.

Response to Non-Final Office Action dated Aug. 3, 2010, U.S. Appl. No. 11/436,284 filed May 18, 2006.

* cited by examiner

SYSTEM TO DETECT AND IDENTIFY ERRORS IN CONTROL INFORMATION, READ DATA AND/OR WRITE DATA

This application is a continuation application of U.S. patent application Ser. No. 11/436,284 filed on May 18, 2006 (still pending).

FIELD OF THE INVENTION

The present invention generally relates to integrated circuit devices and/or high speed signaling of such devices.

BACKGROUND OF THE RELATED ART

In chip communications, errors may occur in transferring information between integrated circuits. For example, noise, crosstalk and/or inter-symbol interference may alter a signal resulting in erroneously received information. An integrated circuit may have an error detection circuit and/or software for detecting erroneously received and/or transmitted information. For example, an integrated circuit may have a checksum and/or parity-checking scheme to detect when erroneous information is received. Further, an integrated circuit may have an error checking and correcting ("ECC") scheme (ECC is also known as error correction code) that not only detects errors in information, but also corrects the error in the information.

However, when large amounts of information are transferred between integrated circuits, complicated error detection and correction schemes may require too much bandwidth and may introduce latencies that degrade system performance. Further, in certain applications, errors in information on one interconnect (e.g. control or address) may result in other information being erroneously transferred or received and thus it may be difficult to determine what the root cause of the error was.

BRIEF DESCRIPTION OF THE DRAWING

Embodiments are illustrated by way of example, and not by way of limitation, in the figures of the accompanying drawings, which like reference numerals refer to similar elements.

DETAILED DESCRIPTION

Figure 1:
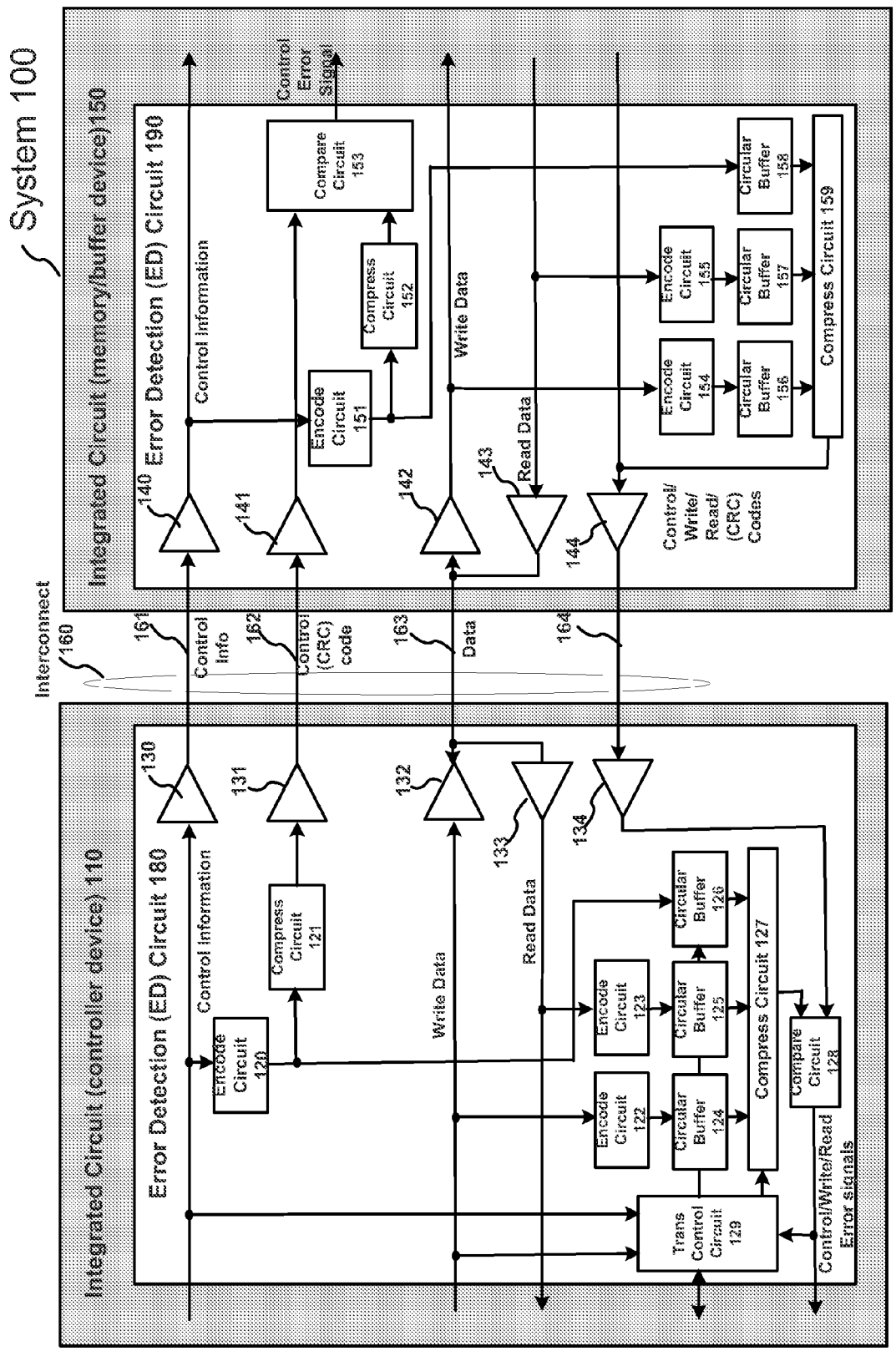
FIG. 1 illustrates a system 100 having error detecting circuits according to an embodiment.

An integrated circuit, such as an integrated circuit ("IC") memory or buffer device, method, and/or system, among other embodiments, generates a plurality of error codes, such as cycle redundancy checking ("CRC") codes, corresponding to control information, write data and read data transactions. The plurality of separately generated CRC codes corresponding to control information, write data and read data is logged, or stored in respective storage circuits, such as circular buffers. The stored plurality of CRC codes corresponding to each transaction may be used to determine whether an error occurred during a particular transaction and thus whether a retry of the particular transaction, or multiple retries, is issued. The integrated circuit includes a compare circuit to compare a CRC code generated by the integrated circuit with a CRC code provided by a controller device. A CRC code corresponding to control information is transferred to a controller device using a data mask signal line that is not being used during a read transaction. The CRC code generated by the integrated circuit then may be compared to a CRC code generated by the controller device to determine whether an error occurred in the control information. The controller device generates and stores a plurality of CRC codes, corresponding to control information, write data and read data. The controller device then compares the CRC codes generated by the controller device with CRC codes generated and stored in the integrated circuit to determine whether an error has occurred during a particular transaction.

An integrated circuit includes a first encode circuit to encode a first code representing write data, a second encode circuit to encode a second code representing read data and a third encode circuit to encode a third code representing control information. The control information includes address information and/or a memory command for accessing a storage array. A first, second and third compression circuit compresses the first, second and third codes to provided compressed first, second and third codes. In another embodiment, a single compression circuit compresses the first, second and third codes to provide a single compressed code. The first and second compressed codes are output to a controller device for detecting errors in transferred write and read data. A compare circuit compares the third compressed code that represents control information with a compressed code from a controller device to determine whether an error occurred in transferring the control information.

In a method embodiment of operating an integrated circuit, a first code that represents write data to be stored in a storage array is generated and stored. A second code that represents read data obtained from a storage array is generated and stored. A third code that represents control information used to access the storage array is generated and stored. A fourth code from a controller device is compared with the third code to generate an error signal. A signal indicating retrying a memory transaction is generated in response to the error signal.

In a method embodiment of operating an integrated circuit, the first code is transferred to a controller device that compares the first code to a code generated by the controller device to generate an error signal that represents an occurrence of erroneous write data. The second code is transferred to a controller device that compares the second code to a code generated by the controller device to generate an error signal that represents an occurrence of erroneous read data. The third code is transferred to a controller device that compares the third code to a code generated by the controller device to generate an error signal that represents an occurrence of erroneous control information. A retry of read data, write data and/or control information may then be initiated in response to the corresponding error signals.

In a system embodiment, a controller device includes a first, second and third circuit to store first, second and third codes that represent write data to be stored in a storage array, read data obtained from the storage array and control information used to access the storage array. An integrated circuit includes a fourth, fifth and sixth circuit to store fourth, fifth and sixth codes that represent write data to be stored in a storage array, read data obtained from the storage array and control information used to access the storage array. The controller device includes a compare circuit to compare 1) the third code with the sixth code to determine when to retry a memory command or retransfer control information, 2) the first code with the fourth code to determine when to retransfer the write data from the controller device to the IC memory device, and 3) the second code with the fifth code to determine when to retransfer the read data from the IC memory device to the controller device.

FIG. 1 illustrates a system 100 including an IC 110, such as a controller device or other master device, coupled to an IC 150, such as an IC memory device or buffer device, by an interconnect 160. ICs 110 and 150 include error detection ("ED") circuits 180 and 190, respectively, for detecting hierarchal types of errors when there is a limited amount of available bandwidth for transferring information between the ICs 110 and 150. For example, errors in different types of memory transactions or operations may be detected by using corresponding error codes stored in ICs 110 and 150. A memory transaction may include providing control information, such as address information and/or memory commands, to access a storage array in an IC memory device. Also, a memory transaction may include providing write data to be stored in a storage array of the IC memory device. A memory transaction may also include accessing, by a memory controller, read data from the storage array of the IC memory device. ED circuits 180 and 190 are able to detect whether an error occurred in the control information, write data and/or read data, singly or in combination.

ED circuit 190 includes receivers 140, 141 and 142 coupled to an interconnect 160 that includes signal lines or paths 161-164. Receiver 140 is coupled to a signal line 161 that carries control information and receiver 141 is coupled to a signal line 162 that carries mask information during a write operation, or other signal line that has available bandwidth when providing error information or CRC codes. In an embodiment, signal line 162 is included with other signal lines that transfer write and/or read data, such as signal line 163. Receiver 142 is coupled to signal line 163 that carries data information, such as write data to be stored in a storage array or read data stored in a storage array. Transmitter 143 is coupled to signal line 163 while transmitter 144 is coupled to signal line 164. Signal line 164 may be included in a serial data bus, such as a SMBus bus, that provides CRC codes from ED circuit 190 to IC 110. In an alternate embodiment, signal line 164 is a signal line that has available bandwidth when providing error information. In another embodiment, signal line 164 is a signal line that has available bandwidth used during a typical memory operation, such as transferring read and/or write data.

Control information is provided by receiver 140 to encode circuit 151 that encodes the control information into an error code. Encode circuit 151 then outputs the encoded control information to circular buffer 158 and compression (compress) circuit 152. Compression circuit 152 compresses the encoded control information or CRC code for control information. Compare circuit 153 compares an error code from IC 110 via receiver 141 with a compressed encoded control information from compression circuit 152 in order to determine when an error occurs in the control information. When the received code from IC 110 does not match or is not equal to the code from compression circuit 152, compare circuit 153 generates an error signal indicating that an error occurred in control information. The error signal from compare circuit 153 causes IC 150 to generate a retry signal to IC 110 which then retries or repeats sending the control information on signal line 161.

In another embodiment, an error signal is provided in an IC buffer device that rejects and/or ignores any subsequent read data and/or write data (to and/or from the IC buffer device) until the error is corrected by, for example, resending the control information (to or from) the IC buffer device. Ignoring or rejecting incoming write and/or read data is done in order to avoid any possible data contamination due to receiving erroneous control information. If data is contaminated or erroneous due to receiving erroneous control information, future transactions may be interpreted incorrectly.

Figure 3:
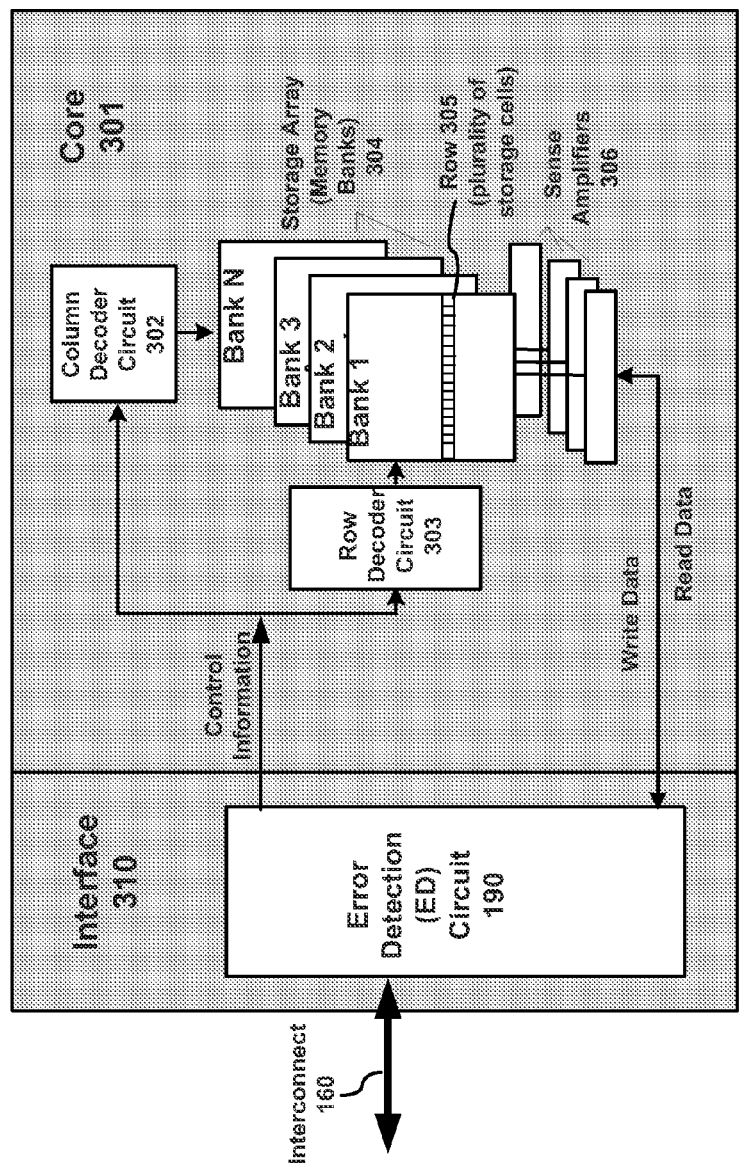
FIG. 3 illustrates an integrated circuit memory device 300 having an error detection circuit according to an embodiment.
Figure 4:
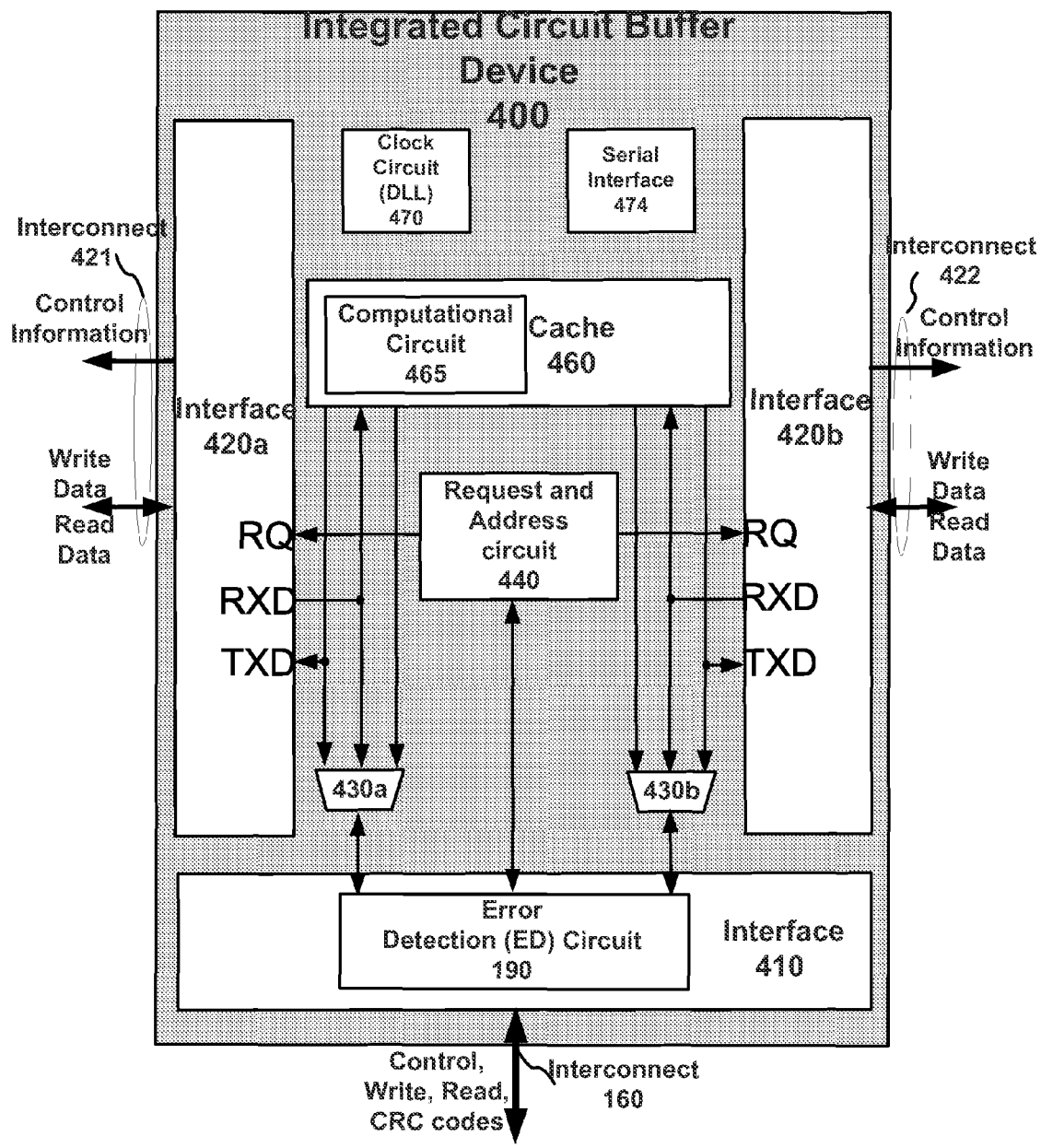
FIG. 4 illustrates an integrated circuit buffer device 400 having an error detection circuit according to an embodiment.

Control information from receiver 140 may be provided to IC memory core, such as column decoder circuit 302 and/or row decoder 303, to access storage arrays in IC memory device 300 as illustrated in FIG. 3 and described below. In another embodiment, control information is provided to request an address circuit 440 in IC buffer device 400 as illustrated in FIG. 4 and described below.

Similarly, write data from receiver 142 is provided to encode circuit 154 that encodes the write data to obtain an error code or CRC code. The encoded write data may then be stored in a circular buffer 156 and compressed by compression circuit 159. In response to a request by IC 110, periodically or during a testing/maintenance operation, compression circuit 159 provides an encoded and compressed write data error code to transmitter 144 which transmits the code representing write data, via signal line 164, to IC 110. As described below, IC 110 then may compare the code representing the write data from IC 150 with an internally generated and stored code representing the write data transmitted to IC 150 to determine when an error occurred in transferring the write data. Retry or retransfer of the write data may be provided by controller 110 on line 163 in response to determining that an error occurred in the transfer of the write data or in response to a write error signal output from compare circuit 128.

Write data from receiver 142 may be provided to a memory core, such as sense amplifiers 306, to store the write data in IC memory device 300 as illustrated in FIG. 3 and described below. In another embodiment, write data is provided to interfaces 420a-b in IC buffer device 400 as illustrated in FIG. 4 and described below.

Read data is provided to transmitter 143 and encode circuit 155 that encodes the read data to obtain an error code or CRC code. The encoded read data is then stored in circular buffer 157 and compressed by compression circuit 159. In response to a request by IC 110, periodically or during a testing/maintenance operation, compression circuit 159 provides an encoded and compressed read data to transmitter 144 that transmits the code representing read data, via signal line 164, to IC 110. As described below, IC 110 then may compare the code representing the read data from IC 150 with an internally generated and stored code representing the read data transmitted to IC 150 to determine when an error occurred in transferring the read data or in response to a read error signal output from compare circuit 128.

In another embodiment, control information, read data and write data are obtained from circular buffers 156-158 and, rather than compressed and transferred singly, are compressed simultaneously to provide a combined compressed code that is output from transmitter 144. This combined compressed code from ED circuit 190 then may be compared with a simultaneously combined compressed code from compression circuit 127 by compare circuit 128 to generate an error signal in ED circuit 180.

Read data provided to transmitter 143 may be provided from a memory core, such as sense amplifiers 306, to obtain stored read data in a storage array of IC memory device 300 as illustrated in FIG. 3 and described below. In another embodiment, read data is provided from interfaces 420a-b in IC buffer device 400 (via multiplexers 430a-b) as illustrated in FIG. 4 and described below.

ED circuit 190 using circular buffer 158, compress circuit 159 and transmitter 144 may likewise provide stored encoded control information via receiver 140 to IC 110.

IC 110 includes transmitters 130, 131 and 132 coupled to interconnect 160. In particular, control information is provided to transmitter 130 that is coupled to signal line 161 and encode circuit 120. Control information or a control transaction is also input to transaction control circuit 129. Encoded control information is then output from encode circuit 120 to compression circuit 121 and circular buffer 126. Compression circuit 121 then provides the code representing the control information or CRC code to transmitter 131 that transmits the code on signal line 162. Write data is provided to transmitter 132, transaction control circuit 129 and encode circuit 122. Encode circuit 122 then outputs a code representing write data to be stored into circular buffer 124. Likewise, read data received from receiver 133 that is coupled to signal line 163 is provided to encode circuit 123 that outputs a code representing the read data received from receiver 133. The code is then input to circular buffer 125.

Transaction control circuit 129 stores recent transactions and controls the output of circular buffers 124, 125 and 126 to compression circuit 127. Transaction control circuit 129 also controls the output of compression circuit 127 to compare circuit 128 that compares codes representing control information, write data and read data generated in IC 110 to codes representing control information, write data and read data received from IC 150 via receiver 134. As described below, IC 110 accesses stored transactions in transaction control circuit 129 and circular buffers 124-126 and 156-158 in retransmitting information, such as control information, write data and/or read data, which caused an error signal to be output from compare circuit 128. When there is no error signal output (or alternatively a pass signal is output) after a comparison by compare circuit 128, stored transactions may be cleared or erased.

IC 110 may compare the code representing the write data from IC 150 (via receiver 134) with an internally generated and stored code representing the write data (stored in circular buffer 124) to output an error signal from compare circuit 128 when an error occurred in transferring the write data. IC 110 may also compare the code representing the read data from IC 150 (via receiver 134) with an internally generated and stored code representing the read data (stored in circular buffer 125) to output an error signal from compare circuit 128 when an error occurred in transferring the read data. IC 110 also may compare the code representing the control information from IC 150 (via receiver 134) with an internally generated and stored code representing the control information (stored in circular buffer 126) to output an error signal from compare circuit 128 when an error occurred in transferring the control information. Compare circuit 128 outputs an error signal when the codes from compression circuit 127 does not match or does not equal the code received from receiver 134.

Control information may be retried or retransmitted from transmitter 130 when an error signal for the control information is output from compare circuit 128. In particular, integrated circuit 110 accesses transaction control circuit 129 to determine what stored transaction to retry. Integrated circuit 110 also accesses circular buffers 124-126 and 156-157 to determine which specific transaction failed or is erroneous. Write data may be retried or retransmitted from transmitter 132 when an error signal for write data is output from compare circuit 128. Read data may be retried or retransmitted from transmitter 143 in IC 150 when an error signal for read data is output from compare circuit 128. In an embodiment, IC 110 provides control information to transmitter 130 in order to retry or retransfer read data that was determined to be erroneous.

Circular buffers 124-126 and 156-158, singly or in combination, are storage circuits to sequentially write and read binary information. A circular buffer may use pointers to identify current locations in the storage circuit for the next binary information to be written to or read from.

Encode circuits 120, 122-123, 151 and 154-155, singly or in combination, are circuits to encode a first set of binary information into a second set of binary information or a code. Encode circuits may encode binary information, such as control information, read data and/or write data, into an ECC that enables errors to be detected. For example, a 64-bit word read from a storage array or to be stored in the storage array may be encoded into a 6-bit ECC which is appended and transferred with the 64-bit word. An ECC is a polynomial, such as a 4-bit, 6-bit, 16-bit or 32-bit polynomial. In other embodiments, N-bit polynomials are used. The resulting polynomial is known as a cycle redundancy checking code ("CRC code" or a "CRC-4" for a 4-bit polynomial or "CRC-6" for a 6-bit polynomial, and so on). CRC-Ns may be defined by the International Telecommunication Union-Telecommunication Standardization Sector ("ITU-TS") are used. A CRC-16 may detect all single and double-bite errors and may ensure detection of a significant number of possible errors. One or more encode circuits 120, 122-123, 151 and 154-155 may include a plurality of XOR gates to output a CRC code.

Transmitters 130-132 and 143-144, singly or in combination, may include output driver circuits to output respective signals onto interconnect 160. The output driver circuit may be pull-up, pull-down and/or push-pull type output driver circuits.

Multiple compression circuits may replace compression circuit 159 and/or 127. A single encode circuit may replace multiple encode circuits.

Figure 2A:
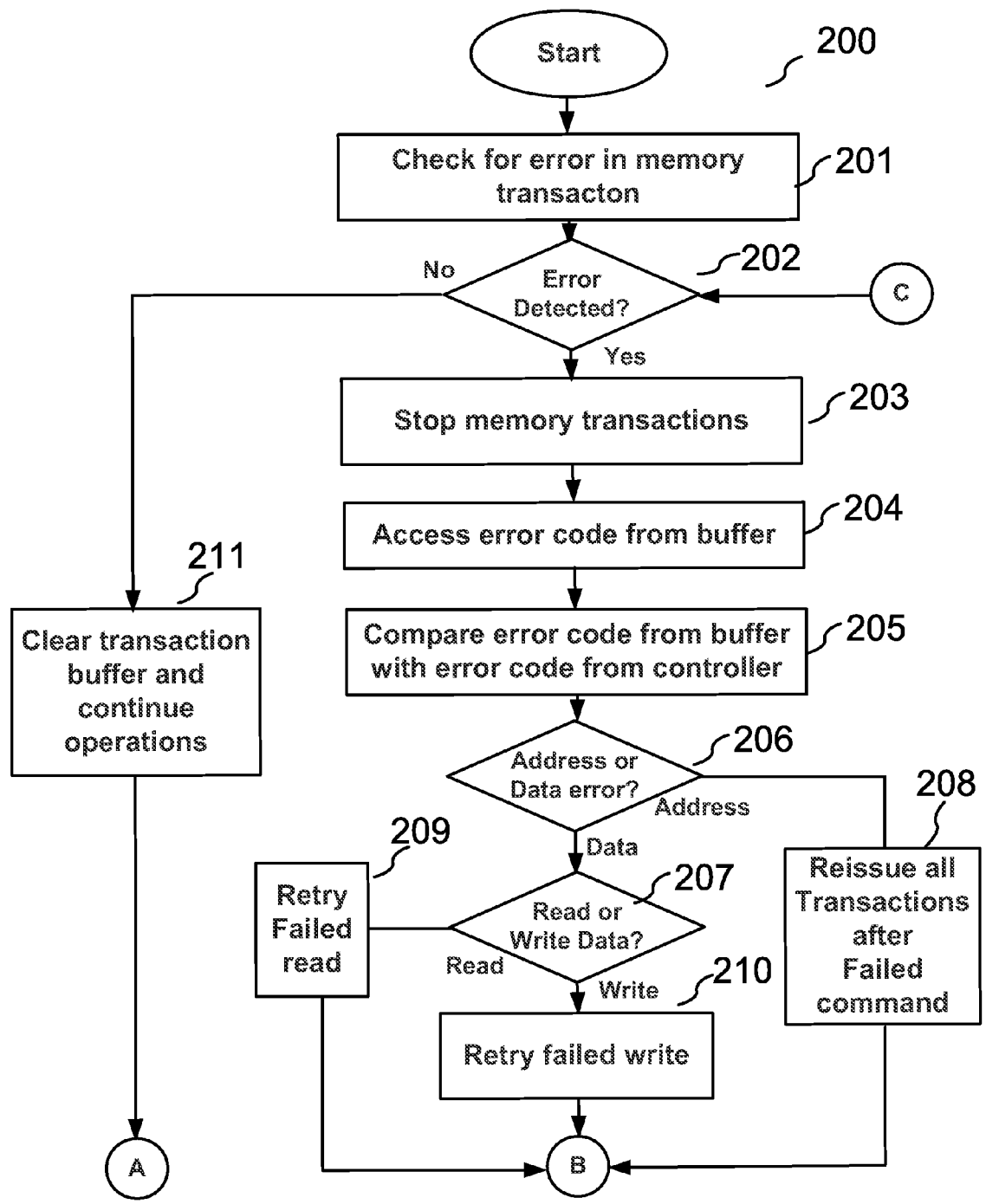
FIGS. 2A-B is a flow chart that illustrates a method 200 to detect different types of errors according to an embodiment.
Figure 2B:
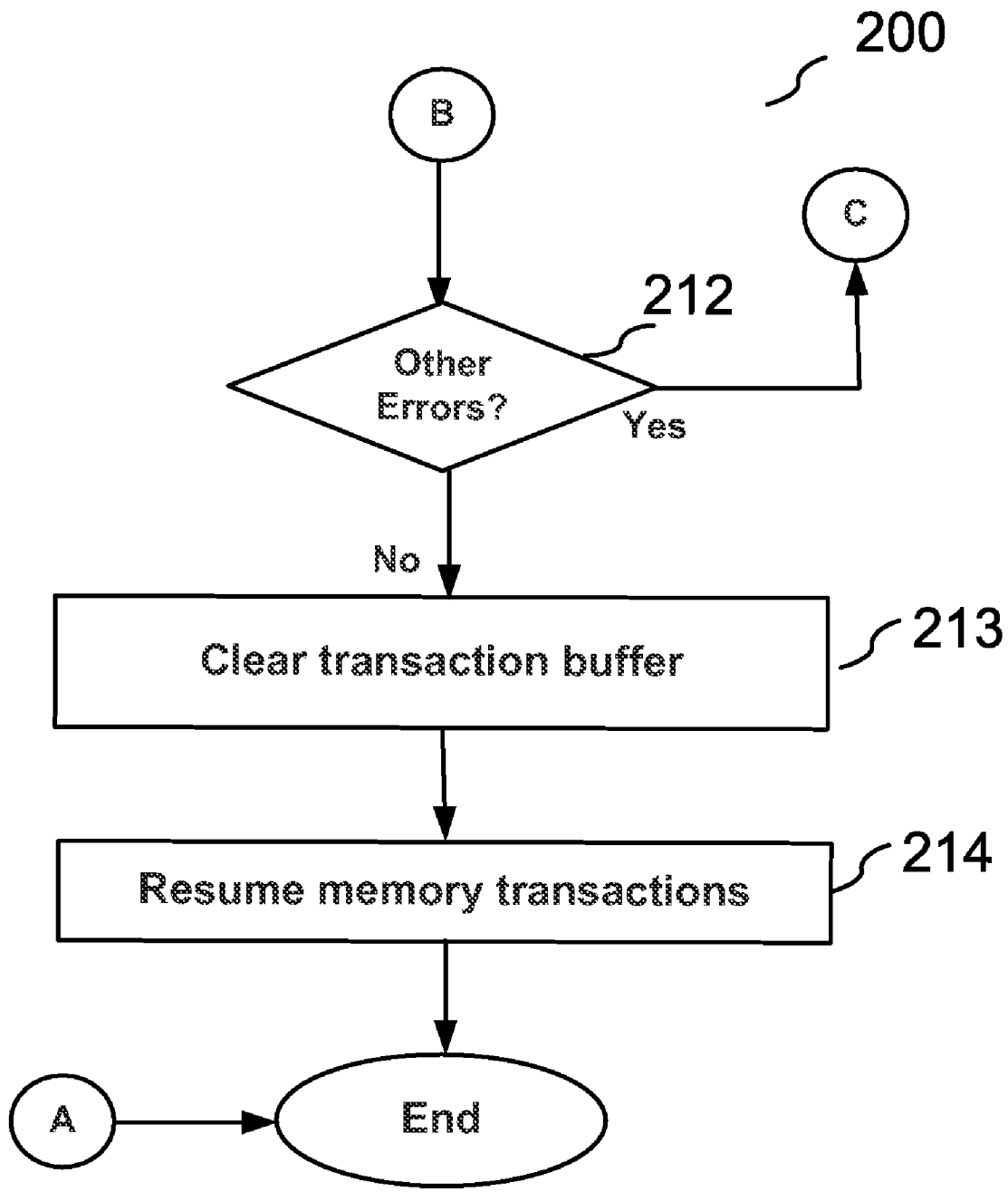

FIGS. 2A-B illustrate method 200 embodiments for operating an integrated circuit, such as ICs 110 and/or 150. In embodiments, logic blocks illustrated in FIGS. 2A-B are carried out by hardware, software or a combination thereof. In embodiments, logic blocks illustrated in FIGS. 2A-B illustrate actions or steps. In embodiments, the circuits illustrated in FIG. 1, singly or in combination, carry out the logic blocks illustrated in FIGS. 2A-B. Other logic blocks that are not shown may be included in various embodiments. Similarly, logic blocks that are shown may be excluded in various embodiments. Also, while method 200 is described in sequential logic blocks, steps of logic blocks of method 200 are completed very quickly or almost instantaneously.

Method 200 begins at logic blocks 201 and 202 where a determination is made whether an error occurred in a memory transaction. The memory transaction may be the transfer of read data. A code representing the read data from IC 150 via receiver 134 may be compared (using compare circuit 128) with a code representing read data via circular buffer 125 and compression circuit 127. Alternatively, a single combined compressed code representing control information, read data and write data may be provided from a memory device and/or buffer device and compared to another internally generated combined compressed code representing control information, read data and write data to determine whether an error occurred in a memory transaction. The determination whether an error is detected may be performed by hardware in a controller device, such as a controller device 501 shown in FIG. 5 and/or buffer device 600 shown in FIG. 6. When an error in the read data and/or compressed combined code is not detected, a buffer storing prior transaction is cleared and memory operations continue as illustrated by logic block 211. Transaction control circuit 129 includes a transaction queue or storage circuit that may be cleared or erased. Otherwise, control transfers to logic block 203 where memory transactions are stopped when an error in the read data and/or compressed combined code is detected. Halting or stopping memory transactions may be performed by a controller device, such as an embedded processor that executes firmware, or by a separate processor that is interrupted in response to an error signal. As illustrated by logic blocks 204-205, codes in circular buffers 124, 125 and 126 are then compared with codes from IC 150 via receiver 134 in order to determine whether an error occurred in the transfer of write data (which was then read in logic block 201 and subsequently determined erroneous), read data or control information, such as address information. A determination is made whether an error occurred in the transfer of address information or write/read data as illustrated by logic block 206. When an error occurs in the address, all memory transactions after the failed transfer of the address information are reissued or retried as illustrated by logic block 208. Otherwise, a determination is made whether an error occurred in the transfer of write data or read data as illustrated in logic block 207. When an error occurs in the transfer of the read data as determined by logic block 207, read data is retried or retransmitted as illustrated by logic block 209. When an error occurred in the transfer of the write data as determined by logic block 207, write data is retried or retransmitted as illustrated by logic block 210. Other errors are checked as illustrated in logic block 212. When other errors are detected, control transfers to logic block 202. Otherwise, control transfers to logic block 213 that illustrates clearing a transaction buffer that stores recent transaction information. Memory transactions are resumed as illustrated in logic block 214 and method 200 ends.

FIG. 3 illustrates an integrated circuit memory device 300 having an ED circuit 190 included in an interface 310. Integrated circuit memory device 300 includes N storage arrays (memory banks) 304 in a memory core 301 having column decoder circuit 302 and row decoder circuit 303. Each memory bank 304 may include a storage array or plurality of storage cells.

Integrated circuit memory device 300 receives control information, such as memory operation commands and address information, from ED circuit 190 in a memory transaction. Control information may include a request packet that represents one or more signals asserted at particular bit windows on particular signal lines.

Row decoder circuit 303 and column decoder circuit 302 are used to access data stored in storage arrays 304 in response to control signals received by way of row decoder circuit 303 and column decoder circuit 302. Row decoder circuit 303 and column decoder circuit 302 may generate control signals in response to commands and addresses received by IC memory device 300 at ED circuit 190. For example, data stored in a plurality of storage cells, such as row 305, is sensed using sense amplifiers 306 in response to a row command. Row 305 is identified by a row address provided to row decoder circuit 303. A subset of the data sensed in sense amplifiers 306 is selected in response to a column command provided to column decoder circuit 302. The subset of the data is identified by a column address provided to column decoder circuit 302.

FIG. 4 illustrates an IC buffer device 400 having an ED circuit 190 in interface 410. As described above, ED circuit 190 receives and/or outputs CRC codes corresponding to different types of memory transactions for IC buffer device 400. As described in detail below, IC buffer device 400 may be disposed on a memory module, housed in a common package along with IC memory devices or dies, or situated on a motherboard, for example, main memory in a personal computer or server. The IC buffer device 400 may also be used in an embedded memory subsystem, for example such as one found on a computer graphics card, video game console or a printer.

FIG. 4 illustrates interface 410 that receives control information, write data and CRC codes from interconnect 160. A multiplexed combination of control information, write data and CRC codes intended for IC memory devices coupled to IC buffer device 400 may be received via interface 410, which may, for example extract the control information. For example, memory commands and address information may be decoded and separated from multiplexed information on interconnect 160 and provided to request and address circuit 440 from interface 410. Write data may be provided to interfaces 420a-b by way of interface 410 and read data from IC memory devices may be received at one or more interfaces 420a-b and provided to interface 410 via multiplexers 430a-b.

Interface 410, and in particular ED circuit 190, receives a CRC code from a controller device or other IC buffer device. Interface 410 along with request and address circuit 440 may route or forward one or more CRC codes intended for another IC from one interconnect coupled to interface 410 to another interconnect coupled to interface 410 (or on the same interconnect). CRC codes generated by ED circuit 190 in interface 410 may be accessed by way of one or more interconnects coupled to interface 410.

A clock signal and other information, may be received on interconnect 160 or by other interconnects, such as a serial bus. Interface 410 may include a transmit circuit or transmitters and a receiver circuit or receivers (or in combination referred to as transceivers) to output and receive signals on interconnect 160. Similarly, interfaces 420a and 420b receive and transmit control information, read data and write data to and from IC memory devices via interconnects 421 and 422, respectively. Interfaces 420a-b may include transmitters and receivers to output and receive signals on interconnects 421 and 422. Transmitters and receivers in interfaces 410 and 420a-b, singly or in combination, may be dedicated to or shared with particular signal lines in the interconnects 421 and 422.

Transmitters and receivers in interfaces 420a-b may transmit and receive signals having a first type of standard signaling characteristic (or protocol), such as a DDR3 signal; while interface 410 includes transmitters and receivers that transmit and receive signals having a second type of standard signaling characteristic, such as a DDR2 signal.

Interfaces 420a-b may include transmitters to transfer control information on a unidirectional interconnect; while transmitters and receivers for write and read data transfer the write and read data on a bidirectional interconnect.

Multiplexers 430a and 430b may perform bandwidth-concentrating operations, between interface 410 and interfaces 420a and 420b, as well as route data from an appropriate source (i.e. target a subset of interconnects, internal data cache) to an appropriate destination. Bandwidth concentration may involve combining the (smaller) bandwidth of each interconnect in a multiple interconnect to match the (higher) overall bandwidth utilized in a smaller group of interconnects. Bandwidth concentration typically utilizes multiplexing and demultiplexing of throughput between the multiple interconnects and smaller group of interconnects. IC buffer device 400 may utilize the combined bandwidth of interfaces 420a and 420b to match the bandwidth of interface 410.

Cache 460 may be incorporated onto IC buffer device 400. Cache 460 may improve memory access time by providing storage of most frequently referenced write and/or read data and associated tag addresses with lower access latency characteristics than those of the IC memory devices. In an embodiment, cache 460 may replace circular buffers 156-158 of ED circuit 190 as shown in FIG. 1.

Computation circuit 465 may include a processor or controller unit, a compression/decompression engine, and so on, to further enhance the performance and/or functionality of IC buffer device 400. In an embodiment, computation circuit 465 is used to compress binary information in replacement of one or more compression circuits 152 and 159 of ED circuit 190 shown in FIG. 1.

Clock circuit 470 includes one or more clock alignment circuits for phase or delay adjusting internal clock signals with respect to an external clock (not shown). Clock alignment circuits may utilize an external clock from an existing clock generator, or an internal clock generator to provide an internal clock, to generate internal synchronizing clock signals having a predetermined temporal relationship. Clock circuit 470 may include a phase lock loop circuit or a delay lock loop circuit. Clock alignment circuits may provide an internal clock signal having a temporal relationship with transferred or received control information, read data and/or write data as will as CRC codes.

Transmitters in interfaces 420a-b (as well as interface 410) may transmit a differential signal that includes encoded clock information and receivers may receive a differential signal that includes encoded clock information. For example, clock circuit 470 extracts the clock information encoded with the data received by the receiver. Furthermore, clock information is encoded with data transmitted by the transmitter. For example, clock information may be encoded onto a data signal, by ensuring that a minimum number of signal transitions occur in a given number of data bits.

Serial interface 474 is an interface to receive serial information from a controller or other configuration circuit. The serial information may include initialization signals for IC buffer device 400 or a memory module. Serial interface 474 may be used by IC 110 (or a controller device) to obtain CRC codes output from compression circuit 159 in ED circuit 190.

Figure 5:
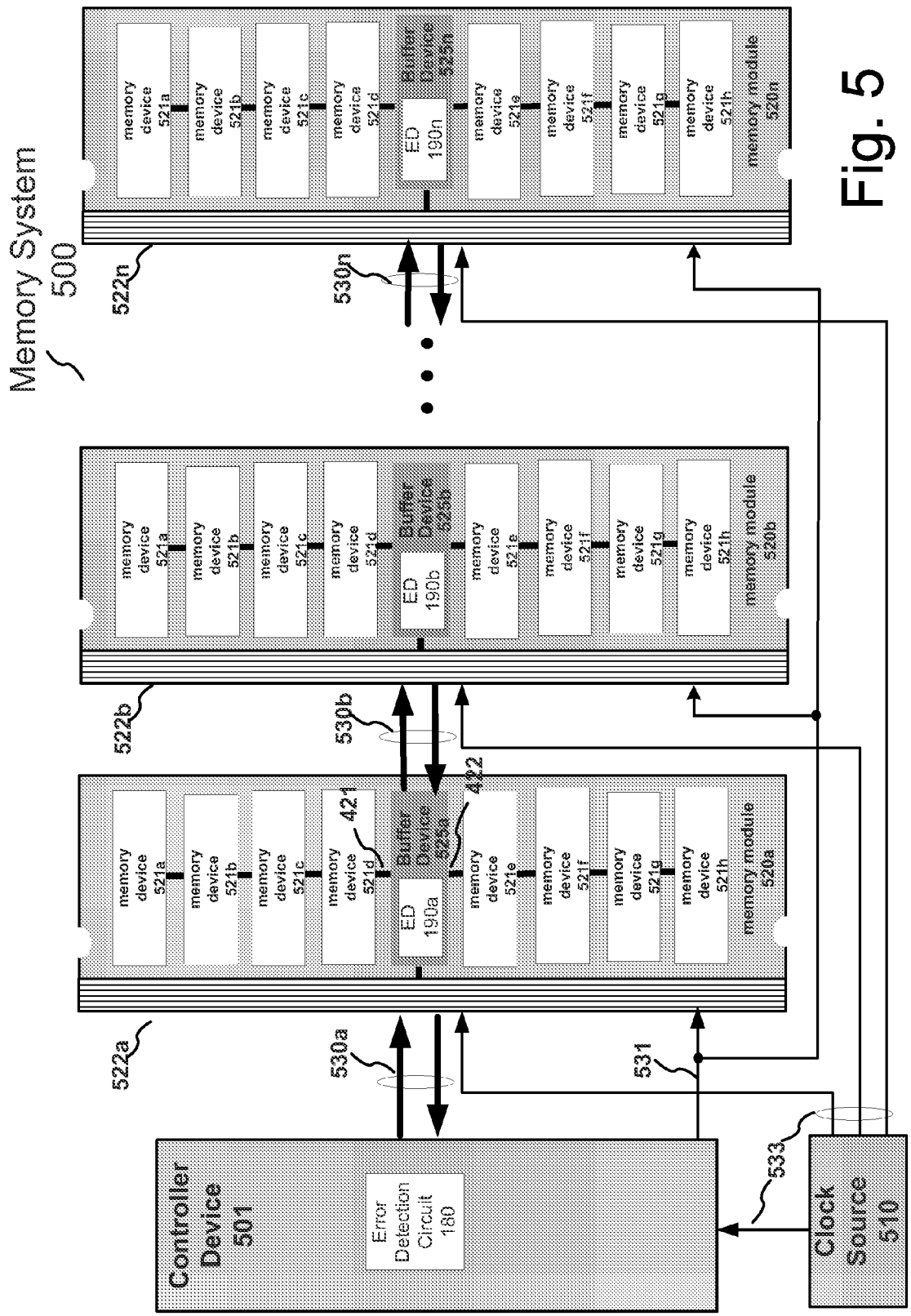
FIG. 5 illustrates a memory system 500 that detects errors according to an embodiment.

FIG. 5 illustrates a memory system 500 including a controller device 501 having an ED circuit 180 coupled to a plurality of memory modules 520a-n. The plurality of memory modules 520a-n include connectors 522a-n to transfer signals between a plurality of respective IC buffer devices 525a-n having respective ED circuits 190a-n and interconnects 530a-n. In response, IC buffer devices 525a-n transfer signals between a plurality of IC memory devices 521a-h and IC buffer devices 525a-n using interconnects 421 and 422. In an embodiment, at least one ED circuit in the plurality of ED circuits 190a-n corresponds to ED circuit 190 shown in FIG. 1.

Controller device 501 and memory modules 520a, 520b and 520n are coupled by interconnects 530a, 530b and 530n. Interconnect 530a corresponds to interconnect 160 shown in FIGS. 1 and 4. Interconnects 530a, 530b and 530n may include respective point-to-point links to transfer control information and write data using unidirectional differential signals from controller device 501 to IC buffer device 525a and from IC buffer device 525a to IC buffer device 525b and so on. Similarly, interconnects 530b and 530a also include respective point-to-point links to transfer read data using unidirectional differential signals from IC buffer device 525b to IC buffer device 525a and from IC buffer device 525a to controller device 501 in response to received control information.

In an embodiment, a point-to-point link denotes one or a plurality of signal lines, each signal line having only two transceiver connection points, each transceiver connection point coupled to a transmitter, a receiver or transceiver circuit. For example, a point-to-point link may include a transmitter coupled at or near one end and a receiver coupled at or near the other end.

One or more interconnects 530a, 530b and 530n may include different types of bus or point-to-point link architectures. Interconnects may also have different types of signaling and clocking type architectures. Embodiments having different link architectures include simultaneous bi-directional links, time-multiplexed bi-directional links and multiple unidirectional links. Voltage or current mode signaling may be employed in any of these link or bus architectures.

One or more memory modules in memory modules 520a-n may be dual-in-line memory modules ("DIMM") having a standard DIMM form factor. A memory module may be included in a single unitary package, as in a "system in package" ("SIP"). In one type of SIP embodiment, a memory module may include a series of integrated circuit dies (i.e., memory devices and buffer device) stacked on top of one another and coupled via conductive interconnect. Solder balls or wire leads may be employed as the connector interface such that the memory module may be fixedly attached to a printed circuit board substrate. A connector interface may also be of a physically separable type that includes, for example, male and female portions such that a memory module is detachable from the rest of a system. Another SIP embodiment may include a number of memory devices and a buffer device disposed, in a two dimensional arrangement, on a common substrate plane and situated inside a single package housing.

A clock source 510 may provide one or more clock signals on interconnect 533 to controller device 501 and memory modules 520a-n. One or more signal lines in interconnect 533 may be coupled to clock circuit 470 of IC buffer devices 525a-n. A clock source 510 may be a clock generator to provide a clock signal. Clock source 510 may be included in controller device 501. Clock signals from clock source 510 may be used to provide temporal relationships between control information, read data and write data as well as CRC codes transferred between controller 501 and memory modules 520a-n, singly or in combination.

Interconnect 531 couples controller device 501 to memory modules 520a-n. Interconnect 531 may be a serial bus coupled to serial interface 474 of IC buffer devices 525a-n.

Returning to the embodiments illustrated by FIG. 1, ICs 110 and 150 may be housed in packages that include a plurality of conducting contacts, such as pins and/or balls, for coupling to interconnect 160. A plurality of contacts, solder balls or pins may be included in an interface to provide electrical connections between an interface and a substrate. In an embodiment, the interface may be removable from a connector or substrate. In an embodiment, ICs 110, 150 and associated interconnects are in one integrated monolithic circuit and/or package housing both ICs 110 and 150.

Figure 6:
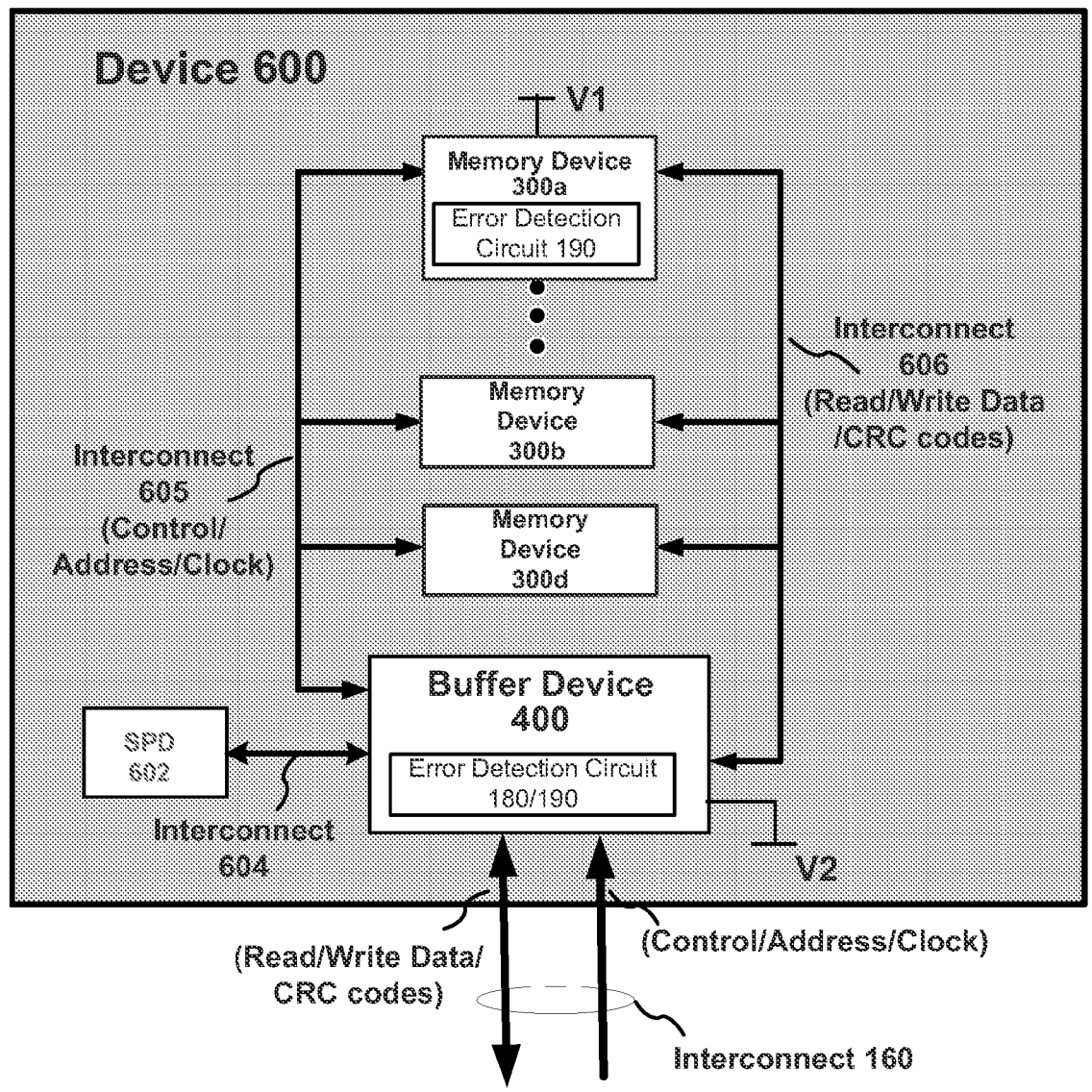
FIG. 6 illustrates a device 600 including a plurality of integrated circuit memory devices and a buffer device having error detection circuits according to an embodiment.

FIG. 6 is a block diagram illustrating a device 600 having a plurality of integrated circuit memory devices (or dies) 300a-d and a buffer device (or die) 400 having error detection circuits 180/190. One or more integrated circuit memory devices 300a-d may correspond to integrated circuit memory device 300 shown in FIG. 3 and buffer device 400 may correspond to integrated circuit buffer device 400 shown in FIG. 4. Buffer device 400 includes error detection circuit 190, including circular buffers 156-158, to determine whether an error occurred in transferring control information, write data and/or read data over interconnect 160 from or to a controller device 110. Similarly, buffer device 400 may also include error detection circuit 180 which is used in detecting errors in transferring control information, write data and/or read data between buffer device 400 and one or more memory devices 300a-d, that may include error detection circuit 190.

Here, data (read and/or write) may be transferred between the plurality of integrated circuit memory devices 300a-d and buffer device 400 on interconnect 606 (Read/Write data). Interconnect 606 is an interconnect situated internal to device 600 and may be a bus for providing bidirectional data signals between a plurality of integrated circuit memory devices 300a-d and buffer device 400. An example of bidirectional data signals includes signals traveling from one or more of integrated circuit memory devices 300a-d to buffer device 400 and also signals traveling from buffer device 400 to one or more of integrated circuit memory devices 300a-d. Interconnect 605 is an interconnect internal to device 600 and may be a bus for providing unidirectional control/address/clock signals from a buffer 400 to a plurality of integrated circuit memory devices 300a-d. In an example of a unidirectional bus, signals travel in only one direction, i.e., in this case, from only buffer device 400 to one or more of integrated circuit memory devices 300a-d. Interconnect 605 may include individual control signal lines, for example, a row address strobe line, column address strobe line, etc., and address signal lines. Interconnect 605 may include a fly-by clock line to transfer a clock signal from buffer device 400 to integrated circuit memory devices 300a-d. Interconnect 605 may transfer a clock signal from one or more integrated circuit memory devices 300a-d to buffer device 400.

Interconnect 160 may be coupled to device 600 and in particular buffer device 400. Interconnect 160 transfers unidirectional control/address/clock signals and bidirectional or unidirectional data signals between buffer device 400 and a controller device 110. Other interconnect and external connect topologies may also be used for device 600 in alternate embodiments. For example, buffer device 600 may be coupled to a single multi-drop control bus, a split multi-drop control bus, or a segmented multi-drop bus.

In an embodiment, buffer device 400 communicates with a serial presence detect device ("SPD") 602 to store and retrieve parameters and configuration information regarding device 600 and/or memory modules 520a-n. In an embodiment, an SPD 602 is a non-volatile storage device. Interconnect 604 couples SPD 602 to buffer device 400. In an embodiment, interconnect 604 is an internal signal path for providing bidirectional signals between SPD 602 and buffer device 400.

SPD 602 may be an EEPROM device. However, other types of SPD 602 are possible, including but not limited to a manual jumper or switch settings, such as pull-up or pull-down resistor networks tied to a particular logic level (high or low), which may change state when a memory module is added or removed from a system.

In an embodiment, device 600 has two separate power sources. Power source V1 supplies power to one or more memory devices (memory devices 300a-d). Power source V2 supplies power to one or more buffers (buffer device 400). In an embodiment, the buffer device 400 has internal power regulation circuits to supply power to the memory devices 300a-d.

Returning to FIG. 4, a storage array 304 includes a two dimensional array of storage cells. Storage cells of a storage array may be dynamic random access memory ("DRAM") cells, static random access memory ("SRAM") cells, FLASH cells, ferroelectric RAM ("FRAM") cells, magnetoresistive or magnetic RAM ("MRAM") cells, or other equivalent types of memory storage cells. IC memory device 300 may be a double data rate SDRAM ("DDR") IC memory device or later generation IC memory device (e.g., "DDR2" or "DDR3"). In an alternate embodiment, IC memory device 300 is an XDR™ DRAM IC memory device or Direct Rambus® DRAM ("DRDRAM") memory device.

In embodiments shown in FIG. 1, IC 110 is a master device, which may be an integrated circuit device that contains other interfaces or functionality, for example, a Northbridge chip of a chip set. The master device may be integrated on a microprocessor or a graphics processor unit ("GPU") or visual processor unit ("VPU"). The master device may be implemented as a field programmable gate array ("FPGA"). The ICs 110 and 150 may be included in various systems or subsystems such as personal computers, graphics cards, set-top boxes, cable modems, cell phones, game consoles, digital television sets (for example, high definition television ("HDTV")), fax machines, cable modems, digital versatile disc ("DVD") players or network routers.

Signals described herein may be transmitted or received between and within devices/circuits by electrical conductors and generated using any number of signaling techniques including without limitation, modulating the voltage or current level of an electrical signal. The signals may represent any type of control and timing information (e.g. commands, address values, clock signals, and configuration information) as well as data. Also, a single signal illustrated may represent a plurality of signals on respective signal lines in an embodiment.

In embodiments, interconnects described herein include a plurality of conducting elements or signal paths such as a plurality of wires and/or metal traces/signal lines. Multiple signal paths may replace a single signal path illustrated in the figures and a single signal path may replace multiple signal paths illustrated in the figures. An interconnect may include a bus and/or point-to-point connection. Interconnects may include control and data signal lines. In an alternate embodiment, interconnects include only data signal lines or only control signal lines. In still other embodiments, interconnects are unidirectional (signals that travel in one direction) or bidirectional (signals that travel in two directions) or combinations of both unidirectional signal lines and bidirectional signal lines.

It should be noted that the various circuits disclosed herein may be described using computer aided design tools and expressed (or represented) as data and/or instructions embodied in various computer-readable media, in terms of their behavior, register transfer, logic component, transistor, layout geometries, and/or other characteristics. Formats of files and other objects in which such circuit expressions may be implemented include, but are not limited to: formats supporting behavioral languages such as C, Verilog, and HLDL; formats supporting register level description languages like RTL; formats supporting geometry description languages such as GDSII, GDSIII, GDSIV, CIF, MEBES; and any other suitable formats and languages. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described circuits may be processed by a processing entity (e.g., one or more processors) within the computer system in conjunction with execution of one or more other computer programs including, without limitation, netlist generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

The foregoing description of the preferred embodiments has been provided for the purposes of illustration and description. It is not intended to be exhaustive or to limit the embodiments to the precise forms disclosed. Modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A memory device, comprising:
   device-resident error management circuitry to generate an error management code for each write transaction;
   device-resident error management circuitry to generate an error management code for each read transaction; and
   transmission circuitry to output information representing the error management codes for each write transaction and the error management codes for each read transaction to a remote controller for comparison with stored error management codes.

2. The device of claim 1, wherein the device-resident error management circuitry to generate the error management code for each write transaction and the device-resident error management circuitry to generate the error management code for each read transaction are included in common circuitry; and wherein the common circuitry includes:
   circuitry to generate a cycle redundancy checking code (CRC) for each write transaction or read transaction and to store at least one of the CRCs in a device-resident buffer.

3. The device of claim 1, wherein:
   the transmission circuitry includes a compression circuitry to compress plural error management codes together representing multiple transactions, to create compressed information; and
   the device is to transmit the compressed information to the remote controller for comparison, such that all error detection in write and read transactions involving the device occurs at a remote controller end of transactions notwithstanding whether the transactions are write or read transactions.

4. The device of claim 1, wherein the memory device is an integrated circuit memory device.

5. The device of claim 1, further comprising at least a device-resident circular buffer to store the error management code for each write transaction and the error management code for each read transaction.

6. The device of claim 1, wherein the transmission circuitry includes:
   a buffer to store the information representing the error management code for each write transaction and the error management code for each read transaction; and
   synchronization logic, implemented as at least one of hardware, firmware or software that recycles buffer storage locations for new transactions, at least for buffer storage locations corresponding to error-free performed transactions.

7. The device of claim 6, wherein the error management code for each write transaction and the error management code for each read transaction each includes at least an error detection code.

8. The device of claim 1, wherein the transmission circuitry includes:
   a buffer to store plural error codes; and
   synchronization logic, implemented as at least one of hardware, firmware or software that selectively outputs the plural error management codes to the remote controller upon an occurrence of a predetermined event.

9. The device of claim 8, wherein the predetermined event is a read transaction initiated by the remote controller, wherein the device further comprises at least one control bit line, and wherein the synchronization logic outputs the plural error management codes via the at least one control bit line upon receipt of the read transaction.

10. The device of claim 9, wherein the at least one control bit line includes at least one data mask bit line, and wherein the synchronization logic outputs compressed information representing the plural error management codes via the at least one data mask bit line during the read transactions.

11. The device of claim 8, wherein the predetermined event includes a receipt of a predetermined command from the remote controller.

12. The device of claim 8, wherein the device further comprises at least one serial control line and wherein the synchronization logic outputs the plural error management codes to the remote controller via the at least one serial control line.

13. A method of a system, comprising:
   generating error management codes for each transaction involving a memory device corresponding to at least plural transaction types;
   outputting information representing the error management codes to a controller; and
   comparing at the controller the information representing the error management codes with stored error management codes to determine whether each transaction was correctly performed.

14. The method of claim 13, wherein the plural transaction types include at least read transactions and write transactions.

15. The method of claim 13, wherein the controller is one of a system central processing unit (CPU) or a dedicated memory subsystem controller, and wherein the memory device is an integrated circuit memory device.

16. The method of claim 13, further comprising retrying a transaction that is determined to have been incorrectly performed.

17. The method of claim 13, wherein:
the method further comprises storing the error management codes in the memory device to selectively output to the controller; and
outputting includes triggering outputting through controller-issuance of a command to the memory device.

18. The method of claim 13, further comprising generating the information representing the error management codes by compressing together the error management codes together, to collectively represent multiple transactions involving the memory device.

19. The method of claim 13, wherein the at least plural transaction types includes at least one type of control transaction, and further comprising retrying each memory transaction following a determination of an error in a transaction involving the at least one type of control transaction.

20. The method of claim 19, wherein:
the method further comprises distinguishing errors representing read and write transactions from errors representing the at least one type of control transaction, and retrying transactions when the error involves a read transaction or a write transaction and not any type of control transaction.

21. The method of claim 13, wherein the outputting information includes compressing together error management codes representing plural recent transactions, the method to compress together error management codes representing multiple transaction types when represented among the plural recent transactions.

22. The method of claim 13, wherein the outputting includes uploading the information representing the error management codes to the controller via one or more data mask lines during a read transaction.

23. The method of claim 13, further comprising synchronizing the memory device and the controller on an intermittent basis, the synchronizing including recycling locations of a memory device storage buffer to permit reuse of the locations for new memory transactions.

24. A method of managing error in a system having memory and a controller, comprising:
generating in the memory, at least one error management code for each transaction that involves either a write or a read operation;
outputting the at least one error management code to the controller; and
comparing the at least one error management code with a stored error management code at the controller to determine whether error has occurred involving the write or read operation.

25. The method of claim 24, wherein the memory is an integrated circuit memory device.

26. The method of claim 24, further comprising in response to error detected by the controller, performing a controller-initiated retry operation.

27. The method of claim 24, wherein outputting the information includes:
generating an error management code within the memory for each write or read operation;
storing the error management codes within the memory;
compressing together plural error management codes to create compressed information;
transmitting the compressed information to the controller; and
using the compressed information for analysis to determine whether error has occurred.

28. The method of claim 27, wherein transmitting includes transmitting the compressed information to the controller upon an occurrence of a predetermined event.

29. The method of claim 24, wherein outputting includes transmitting the information to the controller on a control line not including a bidirectional data bus used for primary transfer of data to be stored in memory.

30. A memory device, comprising:
device-resident error management circuitry to generate an error management code corresponding to at least one of read data or write data;
device-resident error management circuitry to generate an error management code corresponding to a memory address associated with the at least one of read data or write data; and
transmission circuitry to output information representing the error management codes to a controller for comparison with stored error management codes.

31. The device of claim 30, wherein the device-resident error management circuitry to generate the error management code corresponding to at least one of read data or write data and the device-resident error management circuitry to generate the error management code corresponding to a memory address are included in common circuitry; and wherein the common circuitry includes:
circuitry to generate a cycle redundancy checking code (CRC) for each write transaction or read transaction.

32. The device of claim 30, wherein:
the transmission circuitry includes a compression circuitry to compress plural error management codes together to address information as well as transaction information; and
the device to transmit the compressed information to the controller for comparison, such that all error detection in write and read transactions involving the device occurs at a controller end of transactions notwithstanding whether the transactions are write or read transactions.

33. The device of claim 30, wherein the memory device is an integrated circuit memory device.

34. A dynamic random access memory, including:
an error detection code generator to generate codes for both of (a) at least one of read data or write data, and (b) an address corresponding to the at least one of read data or write data; and
a channel to transmit error detection information representing error detection codes after generation to another device for comparison with stored error codes.

35. A dynamic random access memory according to claim 34, wherein:
the error detection code generator generates codes for each of read data or write data; and
said memory further comprises transmission circuitry to transmit error detection information representing both of (a) a read or write data transaction and (b) associated address information to the other device for comparison.

36. A dynamic random access memory according to claim 35, further comprising a buffer for storing error detection information representing both of (a) and (b) prior to transmission to the other device, such that transmission of error detection codes is delayed relative to the read or write transaction.

37. A dynamic random access memory according to claim 36 wherein the error detection code information includes a compressed CRC code that represents both address information and at least one transaction.

38. A method, comprising:
generating error management codes representing (a) accuracy of each transaction involving a memory device for at least one of a read transaction or a write transaction and (b) accuracy of a memory address affected by the transaction;

outputting the error management codes to a controller; and comparing at the controller the error management codes with stored codes to determine whether the associated transaction was correctly performed.

39. The method of claim 38, wherein:

generating error management codes includes generating error management codes for each read transaction or write transaction, and the accuracy of an associated memory address; and wherein outputting error management codes includes outputting the error management codes representing both of the transaction and the associated memory address.

40. The method of claim 39, further comprising retrying a transaction that is determined to have been incorrectly performed.

41. The method of claim 39, wherein the method further comprises storing the error management codes in the memory device for a period of time before selectively outputting the codes to the controller.

* * * * *